(12) United States Patent
DiFoggio

(10) Patent No.: US 8,752,305 B2
(45) Date of Patent: Jun. 17, 2014

(54) APPARATUS AND METHOD FOR DETERMINING THE DIRECTION EAST

(75) Inventor: Rocco DiFoggio, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 195 days.

(21) Appl. No.: 13/273,667

(22) Filed: Oct. 14, 2011

(65) Prior Publication Data

US 2013/0091716 A1 Apr. 18, 2013

(51) Int. Cl.
*G01C 9/16* (2006.01)
*E21B 47/022* (2012.01)
*G01C 9/00* (2006.01)

(52) U.S. Cl.
USPC .............................. 33/308; 33/310

(58) Field of Classification Search
USPC ........... 33/308, 300, 301, 302, 303, 304, 306, 33/307, 310, 344, 346
See application file for complete search history.

(56) References Cited

U.S. PATENT DOCUMENTS

| | | | | |
|---|---|---|---|---|
| 1,938,872 A | * | 12/1933 | Stone et al. | 33/313 |
| 1,987,696 A | * | 1/1935 | McLaughlin et al. | 33/304 |
| 2,116,120 A | * | 5/1938 | Malmgren | 33/313 |
| 3,896,619 A | * | 7/1975 | Hunter et al. | 33/300 |
| 4,480,391 A | | 11/1984 | Sharp et al. | |
| 6,176,323 B1 | | 1/2001 | Weirich et al. | |
| 7,325,322 B2 | * | 2/2008 | Fulks et al. | 33/366.24 |
| 2004/0200083 A1 | * | 10/2004 | Yarbro | 33/304 |
| 2008/0314641 A1 | * | 12/2008 | McClard | 175/57 |

FOREIGN PATENT DOCUMENTS

JP 2008014893 1/2008
KP 1020110069193 6/2011

OTHER PUBLICATIONS

International Search Report and Written Opinion dated Mar. 27, 2013 for International Application No. PCT/US2012/058754.
Grove, Paul D.; Principles of GNSS, inertial, and multi-sensor integrated navigation system, "Inertial Sensors," 2008, pp. 97-120.
Mungan, C.E.; Coriolis Correction to Freefall, Fall 2005, www.usna.edu/Users/physics/mungan/.../CoriolisFreefall.pdf.
KVH; "Overview of Compass Tecnhology," http://www.kvh.com/Search.aspx?Keywords=Overview%20of%20Compass%20Technology, White Paper: Overview of Compass Technology, 15 pages.
Stommel, Henry M. et al.; "An Introduction to the Coriolis Force," Columbia University Press, 1989, Library of Congress Cataloging-in-Publication Data, 1920, p. 196.

* cited by examiner

*Primary Examiner* — Christopher Fulton
(74) *Attorney, Agent, or Firm* — Cantor Colburn LLP

(57) ABSTRACT

In one aspect a method of determining direction east is provided that in one embodiment includes dropping objects under influence of gravity, determining locations where the objects drop, and determining the direction east from the locations where the objects drop.

23 Claims, 4 Drawing Sheets

400

| | Height z(m) | Freefall Time t(sec) |
|---|---|---|
| | 50.00 | 3.19 |

Freefall from Rest

| Latitude (Degrees) | Due East x(m) | Due North y(m) |
|---|---|---|
| 0 | 7.74E-03 | -5.36E-23 |
| 5 | 7.71E-03 | -7.59E-08 |
| 10 | 7.63E-03 | -1.50E-07 |
| 15 | 7.48E-03 | -2.19E-07 |
| 20 | 7.28E-03 | -2.81E-07 |
| 25 | 7.02E-03 | -3.35E-07 |
| 30 | 6.71E-03 | -3.79E-07 |
| 35 | 6.34E-03 | -4.11E-07 |
| 40 | 5.93E-03 | -4.31E-07 |
| 45 | 5.48E-03 | -4.37E-07 |
| 50 | 4.98E-03 | -4.31E-07 |
| 55 | 4.44E-03 | -4.11E-07 |
| 60 | 3.87E-03 | -3.79E-07 |
| 65 | 3.27E-03 | -3.35E-07 |
| 70 | 2.65E-03 | -2.81E-07 |
| 75 | 2.00E-03 | -2.19E-07 |
| 80 | 1.34E-03 | -1.50E-07 |
| 85 | 6.75E-04 | -7.59E-08 |
| 90 | 0.00E+00 | 0.00E+00 |

FIG. 4

APPARATUS AND METHOD FOR DETERMINING THE DIRECTION EAST

BACKGROUND

1. Field of the Disclosure

This disclosure relates generally to apparatus and methods for determining a compass direction and, in particular, for determining a compass direction downhole.

2. Background of the Art

Oil wells (also referred to as wellbores or boreholes) are drilled with a drill string that includes a tubular member (also referred to as a drilling tubular) having a drilling assembly (also referred to as bottomhole assembly or "BHA") which includes a drill bit attached to the bottom end thereof. The drill bit is rotated to disintegrate the rock formation to drill the wellbore and thus enable completion of the borehole. The BHA and the tubular member include devices and sensors for providing information about a variety of parameters relating to the drilling operations (drilling parameters), the behavior of the BHA (BHA parameters) and the formation surrounding the wellbore being drilled (formation parameters). The devices and sensors use power to perform measurements. A large number of currently drilled wellbores are deviated wellbore and horizontal wellbores. The BHA used for drilling such wellbores usually includes one or more devices configured to steer the BHA so as to drill the deviated/horizontal wellbore sections. The BHA includes one or more devices that provide reference positions that are used by a controller or processor to steer the BHA.

The disclosure herein provides apparatus to determine the direction east that may be utilized to perform an operation downhole, including steering the BHA along a selected direction.

SUMMARY OF THE DISCLOSURE

In one aspect, a method of determining a compass direction is provided that in one embodiment includes: allowing at least one object to move under influence of gravity; determining a location of the at least one object during its move; and determining the compass direction from the location of the at least one object during its move and another location.

In another aspect, an apparatus for determining a compass direction is provided that in one embodiment includes a source configured to drop objects under influence of gravity, a device configured to receive the dropped objects and provide signals corresponding to locations on the device where the objects drop; and a processor configured to determine the compass direction utilizing the locations on the device where the objects drop. Alternatively, the apparatus can use an object immersed in a fluid that has a higher mass density than the object so that the object will, upon release, rise under the influence of gravity and move slightly to the west of plumb.

Examples of certain features of the apparatus and method disclosed herein are summarized rather broadly in order that the detailed description thereof that follows may be better understood. There are, of course, additional features of the apparatus and method disclosed hereinafter that will form the subject of the claims.

BRIEF DESCRIPTION OF THE DRAWINGS

The disclosure herein is best understood with reference to the accompanying figures in which like numerals have generally been assigned to like elements and in which:

FIG. 4 shows a table listing deviations of a dropped object with respect to latitude in one embodiment of the present invention.

DETAILED DESCRIPTION OF THE EMBODIMENTS

Figure 1:
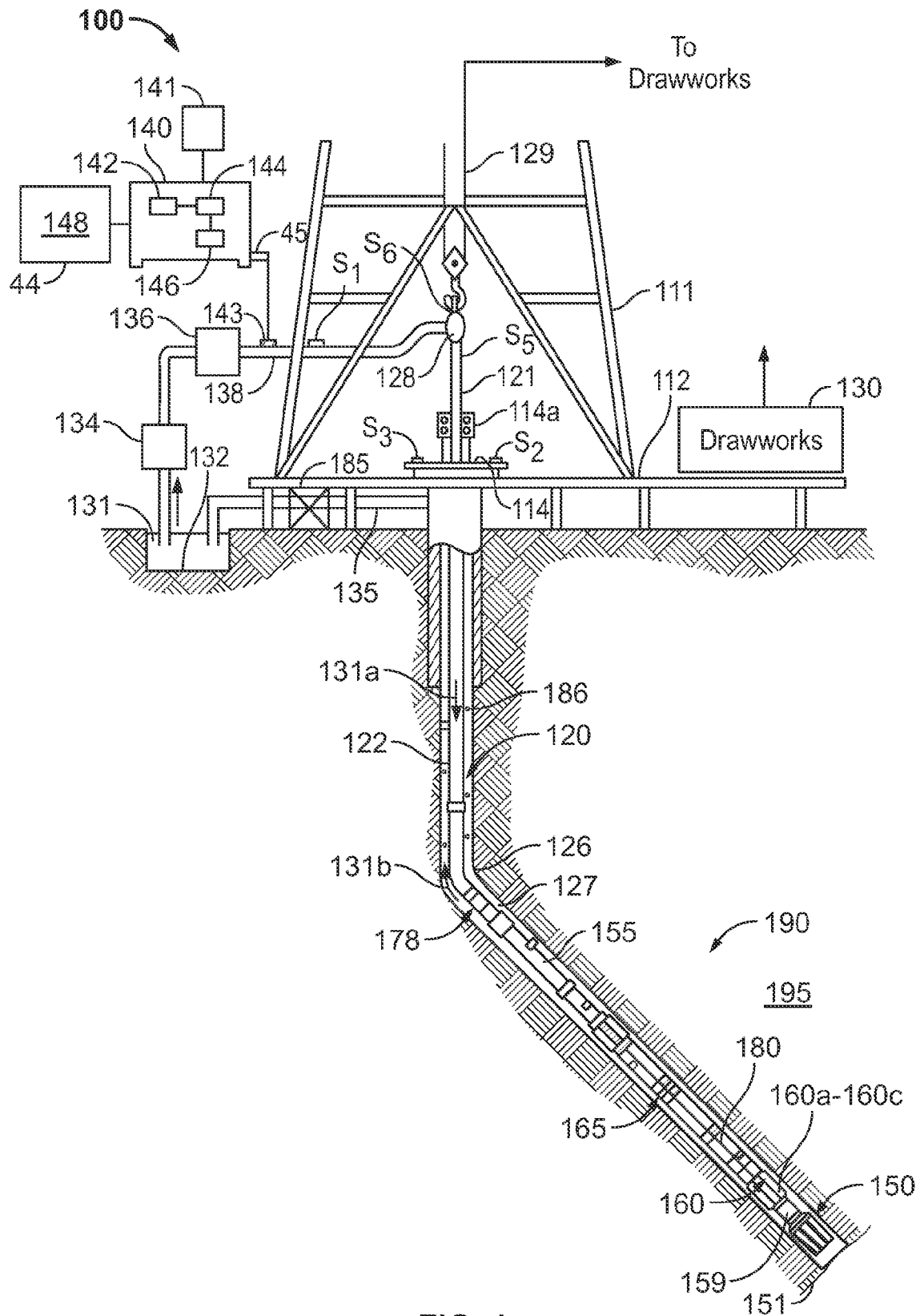
FIG. 1 is an elevation view of a drilling system that includes a device for determining direction of the drill string during drilling of the wellbore.

FIG. 1 is a schematic diagram of an exemplary drilling system 100 that includes a drill string 120 having a drilling assembly attached to its bottom end. Drill string 120 includes a drilling assembly or bottomhole assembly ("BHA") 190 conveyed in a borehole 126. The drilling system 100 includes a conventional derrick 111 erected on a platform or floor 112 that supports a rotary table 114 that is rotated by a prime mover, such as an electric motor (not shown), at a desired rotational speed. A tubing (such as jointed drill pipe) 122, having the drilling assembly 190 attached at its bottom end, extends from the surface to the bottom 151 of the borehole 126. A drill bit 150, attached to drilling assembly 190, disintegrates the geological formations when it is rotated to drill the borehole 126. The drill string 120 is coupled to a draw works 130 via a Kelly joint 121, swivel 128 and line 129 through a pulley. Draw works 130 is operated to control the weight on bit ("WOB"). The drill string 120 may be rotated by a top drive 114a rather than the prime mover and the rotary table 114.

In an aspect, a suitable drilling fluid 131 (also referred to as the "mud") from a source 132 thereof, such as a mud pit, is circulated under pressure through the drill string 120 by a mud pump 134. The drilling fluid 131 passes from the mud pump 134 into the drill string 120 via a desurger 136 and the fluid line 138. The drilling fluid 131a from the drilling tubular discharges at the borehole bottom 151 through openings in the drill bit 150. The returning drilling fluid 131b circulates uphole through the annular space 127 between the drill string 120 and the borehole 126 and returns to the mud pit 132 via a return line 135 and drill cutting screen 185 that removes the drill cuttings 186 from the returning drilling fluid 131b. A sensor $S_1$ in line 138 provides information about the fluid flow rate. Surface torque sensor $S_2$ and a sensor $S_3$ associated with the drill string 120 provide information about the torque and the rotational speed of the drill string 120. Rate of penetration of the drill string 120 may be determined from sensor $S_5$, while the sensor $S_6$ may provide the hook load of the drill string 120.

In some applications, the drill bit 150 is rotated by rotating the drill pipe 122. However, in other applications, a downhole motor 155 (mud motor) disposed in the drilling assembly 190 may rotate the drill bit 150 alone or in addition to the drill string rotation.

A surface control unit or controller 140 receives signals from the downhole sensors and devices via a sensor 143 placed in the fluid line 138 and signals from sensors $S_1$-$S_6$ and other sensors used in the system 100 and processes such signals according to programmed instructions provided by a program to the surface control unit 140. The surface control unit 140 displays desired drilling parameters and other information on a display/monitor 141 that is utilized by an operator to control the drilling operations. The surface control unit 140 may be a computer-based unit that may include a processor 142 (such as a microprocessor), a storage device 144, such as a solid-state memory, tape or hard disc, and one or more computer programs 146 in the storage device 144 that are accessible to the processor 142 for executing instructions contained in such programs. The surface control unit 140 may further communicate with a remote control unit 148. The surface control unit 140 may process data relating to the drilling operations, data from the sensors and devices on the surface, data received from downhole devices and may control one or more operations of the downhole and surface devices.

The drilling assembly 190 may also contain formation evaluation sensors or devices (also referred to as measurement-while-drilling, "MWD," or logging-while-drilling, "LWD," sensors) for determining resistivity, density, porosity, permeability, acoustic properties, nuclear-magnetic resonance properties, corrosive properties of the fluids or the formation, salt or saline content, and other selected properties of the formation 195 surrounding the drilling assembly 190. Such sensors are generally known in the art and for convenience are collectively denoted herein by numeral 165. The drilling assembly 190 may further include a variety of other sensors and communication devices 159 for controlling and/or determining one or more functions and properties of the drilling assembly (such as velocity, vibration, bending moment, acceleration, oscillations, whirl, stick-slip, etc.) and drilling operating parameters, such as weight-on-bit, fluid flow rate, pressure, temperature, rate of penetration, azimuth, tool face, drill bit rotation, etc.

Still referring to FIG. 1, the drill string 120 further includes energy conversion devices 160 and 178. In an aspect, the energy conversion device 178 is located in the BHA 190 to provide an electrical power or energy, such as current, to sensors 165 and/or communication devices 159. Energy conversion device 178 is located in the drill string 120 tubular, wherein the device provides electrical energy to the downhole sensors and devices. The drilling assembly further includes a steering device 160 that includes steering members (also referred to a force application members) 160a, 160b, 160c that may be configured to independently apply force on the borehole 126 to steer the drill bit along any particular direction. The drilling assembly further contains a device 180 for determining direction east downhole, which information is then utilized to determine the orientation of the drilling assembly 190 or the drill bit 150. The bottomhole assembly 190 further comprises an orientation sensor 180 for determining a compass direction using the methods disclosed herein. The determined compass direction can be used to determine a direction of the drill assembly and therefore in as input to the steering unit. The drilling assembly can therefore be steering using the compass direction determined using the methods disclosed herein. In aspects, such information is then utilized to steer drilling assembly 190 or the drill bit 150 along a selected direction by utilizing the steering device 160. Details of the device 180 are described in reference to FIGS. 2-4.

Figure 2:
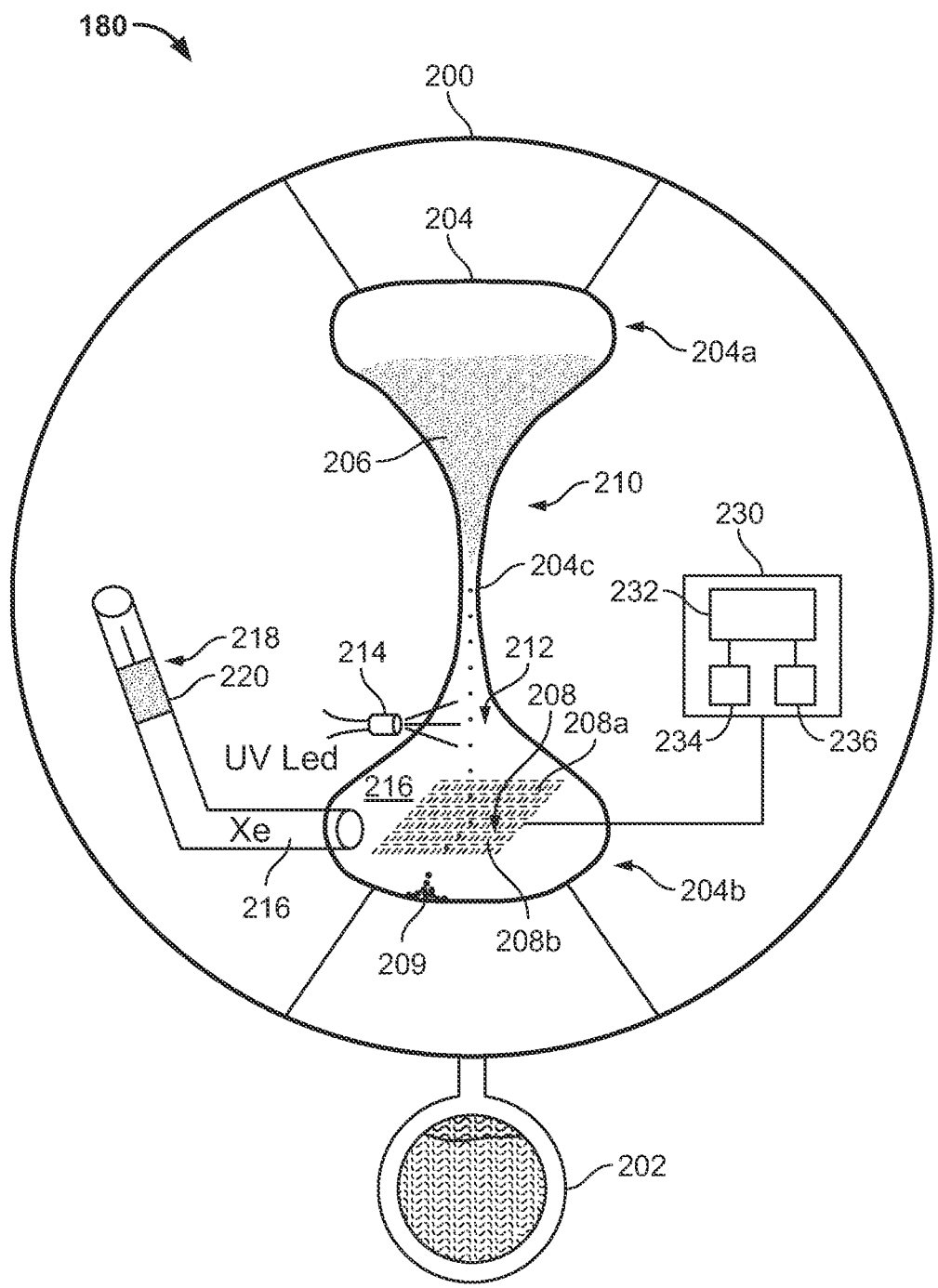
FIG. 2 is a line diagram of a device for determining a direction, made according an embodiment of the disclosure.

FIG. 2 shows a detailed view of an exemplary apparatus 180 for determining a compass direction made according to one embodiment of the disclosure. The apparatus 180 includes a gimbaled enclosure 200 supporting a structure 210 that determines the compass direction. The gimbaled enclosure 200 is coupled to a pendulum bob 202 that orients the structure 200 along a plumb line direction ("plumb line") as discussed below with respect to FIG. 3. The pendulum bob 202 is in one embodiment is a hollow pendulum bob filled with a viscous fluid and internal obstructions in order to dampen transitory motion due to vibrations and cause the structure to come to rest more quickly after being moved. The structure 210 includes an hourglass 204 attached to the gimbaled enclosure 200. The hourglass 204 has a long narrow neck and contains a plurality of objects 206, such as in a top portion 204a of the hourglass 204 and a sensor 208 in a bottom half 204b of the hourglass 204. The microballoons (also called "glass bubbles") come in different grades, generally from 35-80 microns in diameter and have low density, such as 0.22 g/cc for the 35-micron diameter grade. The sensor 208 includes a sensor array 208a having individual sensors 208b, each defining a pixel in a matrix. The objects 206 pass through a neck 204c of the hourglass 204 to fall or drop down upon the sensors 208b of the sensor array 208a. The sensor 208 records the location of the impact of the objects 206 (i.e., the locations where the objects 206 drop on the individual sensors) and sends the recorded location to a control unit 230. The control unit may be located outside the structure 200. In one aspect, the controller may include a processor 232, such as a microprocessor, a data storage device 234, such a memory device and programmed instructions 236 executable by the processor 232. In one aspect, the sensor array 208 may be a planar array oriented substantially horizontally, i.e., substantially perpendicular to the plumb line. A small pitch to the array 208a may be provided to allow the dropped objects 206 to move to a selected location 209. A small deviation of the sensor array from an exact horizontal orientation allows the microballoons to roll off of the sensor array after impact. In an exemplary embodiment, the sensor array 208 may include individual charge-coupled devices (CCD) arranged in the form of an array or pixels, each pixel having a defined location relative the plumb line. In aspects, the objects 206 (such as glass microballoons) are generally coated with a fluorescent material 212 that glows when exposed to an ultraviolet (UV) light. A UV light source 214 may be provided to illuminate the fluorescent-coated objects, preferably just before they strike the CCD array thereby allowing the objects 206 to glow upon impact with the sensors array, enabling the sensor array 208 to record a light signal at the impact location (pixel) for each dropped object. To define east, the pixels where the objects drop may be compared to the pixel of the CCD array that corresponds to a plumb line, which can be determined in advance. The close spacing (such as 4 microns) of CCD pixel centers means that small eastward deviations of 50 to 100 microns can be detected, which allows for measurable eastward deviations for very short (e.g., 1 inch) falling distances especially if the object falls in a buoyant fluid that slows its fall.

In another aspect, at least the lower half 204a of the hourglass includes a medium 216 having a selected density. The density of the medium 216 is generally selected to be less than the density of the objects 206. In various embodiments, the medium 216 is a Xenon gas. A pressure device 218 may be coupled to the hourglass and activated to adjust a pressure and density of the Xenon gas 216 inside the hourglass 204. The pressure device 218 may include a piston 220 that translates within the pressure device to adjust the density of the Xenon gas 216. Approximately 470 psi of Xenon at room temperature (25 degrees Celsius) corresponds to the 0.22 g/cc density of 35-micron diameter microballoons. In operation, the objects drop on the array 208a, the locations of the dropped objects are recorded by the controller 230. As described in more detail later, the objects 206 will drop east of the bottom of the plumb line location on the array 208a. The controller 230 using the locations where the objects 206 drop determines a line from the plumb line bottom and the direction of such line is the direction east. It will be noted that to determine the direction east only a single object drop location is needed.

However, it may be useful to drop more than a single object to improve the accuracy of the direction east. In another aspect, the pressure of the medium 216 may be varied so that the flight time of two or more dropping objects is different. The closer the density of the Xenon gas is to the density of the microballoon (without exceeding the microballoon density), the slower that the microballoon will move or fall and further east it will fall. Therefore, knowing the Xenon pressure versus the object landing pixels, one can draw a line that points east without having to make reference to a plumb line pixel. Viscous drag of the gas on the microballoon will further slow its fall and increase its eastward deviation. Thus, the falling objects will likely drop at distances that differ in their eastward deviation from a plumb line based on their flight times. The slower objects will fall further east from the plumb line bottom compared to the faster falling objects. In this way, the controller may determine a line between the locations of two or more dropped objects, with such a line defining the direction east.

In one aspect, the control unit 230 may be configured to receive signals from the sensor array 208 and processes such signals according to programmed instructions for determining a compass direction east from the signals. The control unit 230 may be further coupled to a steering unit of the drilling assembly of FIG. 1 to steer the drilling assembly 120 in using the compass direction determined as described herein. The control unit 230 and/or control unit 140 (FIG. 1) may be configured to control the steering device 160 in the drilling assembly 190 (FIG. 1).

Figure 3:
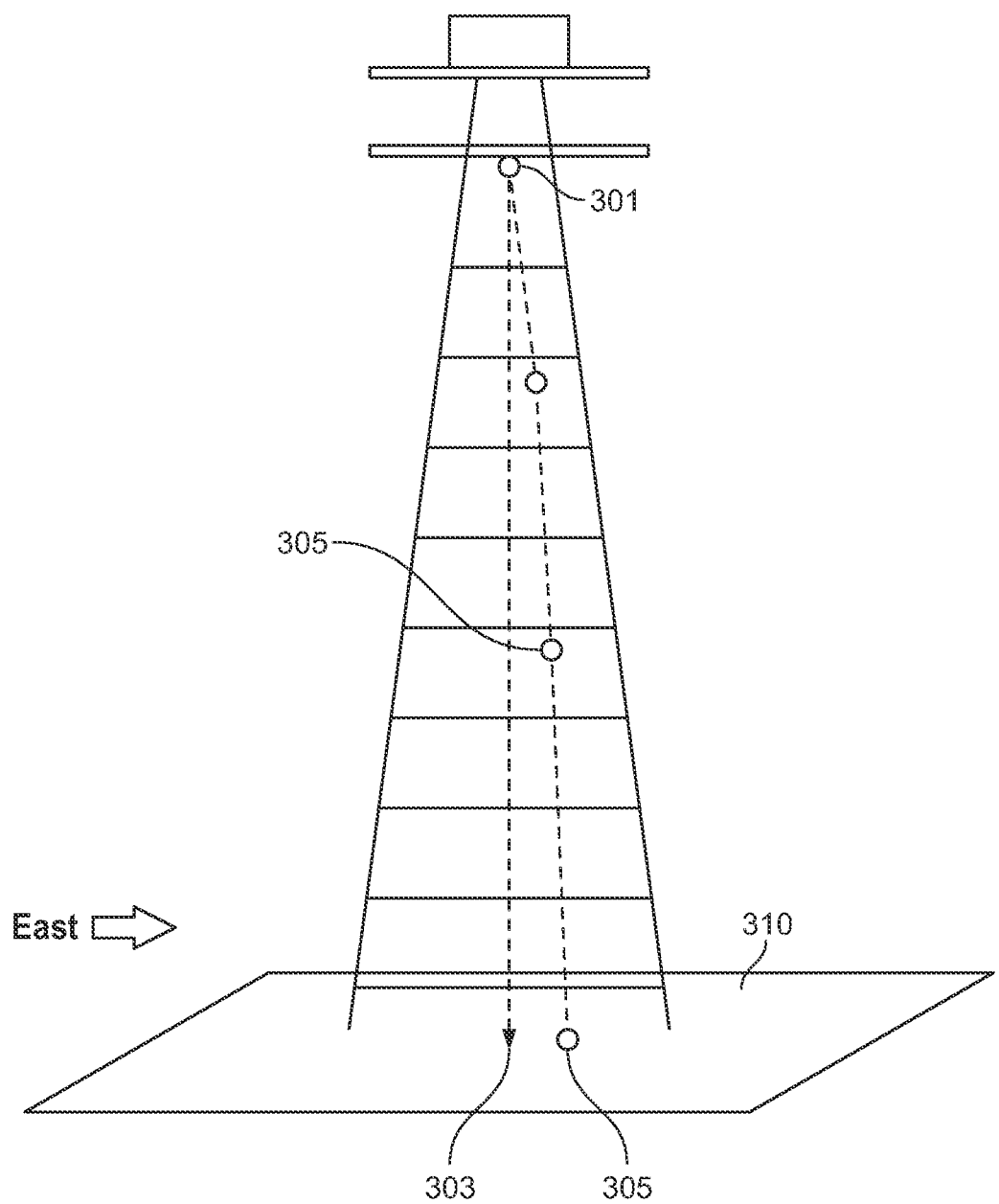
FIG. 3 illustrates a principle for determining a compass point orientation using the exemplary methods of the present disclosure.

FIG. 3 illustrates a principle underlying determining a compass direction using the exemplary methods of the present disclosure. A first location 301 is defined above a second location 303. The second location may be defined corresponding to a plumb line from the first location to a second location where the plumb line intersects with a horizontal plane 310. An object 308 is dropped from the first location 301 towards the second location 303. One can explain the eastward deflection by applying conservation of angular momentum in an inertial frame of reference (a frame that is not accelerating for rotating relative to the fixed stars). Alternatively, one can formulate the problem in terms of the Coriolis effect. The Coriolis effect exists when one chooses to use as one's frame of reference a rotating frame, such as the earth, rather than using an inertial frame of reference. Coriolis forces are "fictitious" forces in the sense that were invented to allow one to apply Newton's laws of motion (which were meant only for use in an inertial frame of reference) in a non-inertial, rotating frame of reference. Regardless of how one formulates the problem, in the process of falling, the falling object 308 is primarily deflected east to impact the horizontal plane 310 at a third location 305 separate from the second location 303. That is, the direction of the deflection of a falling object is primarily eastward, such that the third location 305 lies essentially due east of the second location 303. Determining the second and third locations may therefore be used to determine the direction east and to thereby orient a device in any desired direction.

For an object dropped from a first location, the eastward deflection of the object is given by the known Eq. (1):

$$x = \frac{g\sin\theta}{4\Omega^2}[2\Omega t - \sin(2\Omega t)] \text{ (EAST)} \tag{1}$$

Wherein $\theta$ is the colatitude (the complement of the latitude) $\Omega$ is the rotational rate of the non-inertial frame (i.e., the earth's rotation) and t is the time of falling and positive values of x correspond to east and negative to west. Therefore, the size of the deflection is related to the duration of travel and is generally small in comparison to travel distances. For example, for an object dropped from a 50 meter tower, the eastward deflection is about 8 millimeters at its maximum (which is at the equator).

From Eq. (2), the magnitude of the eastward deflection can be increased by increasing the falling time of the object. The falling time can be increased by either increasing the height of the fall or by reducing the fall acceleration and fall speed. An exemplary method for increasing the fall time is by having the object fall through a medium that supplies a buoyant force to the object. The effective acceleration rate of an object in a buoyant non-viscous medium is related to the densities of the object and the medium as shown in Eq. 2. For a viscous medium, the object will fall even slower and may reach a terminal velocity after which the acceleration becomes zero.

$$a = g\frac{(\rho_O - \rho_M)}{(\rho_O + \rho_M)} \tag{2}$$

Wherein g is the gravitational constant (9.8 m/sec^2) $\rho_O$ is the density of the object and $\rho_M$ is the density of the medium. In an exemplary embodiment, the object is a 35 micron diameter hollow glass microballoon whose density is 0.22 grams/cc. The microballoons fall through a medium of pressurized dense gas (Xenon at 420-470 psi) having a density of 0.218 grams/cc. For the fluid density of 0.218 grams/cc, an effective acceleration rate of the microballoons is about 0.048 m/sec², and a terminal velocity of the microballoon is $2.75 \times 10^{-5}$ m/sec. A chart showing deflections of the object falling at different latitudes is shown in FIG. 4.

In an alternative embodiment, the density of the Xenon gas may be altered using the pressure device 218 and piston 220 of FIG. 2. A plurality of microballoons are dropped from the first location and the density of the Xenon gas varied so that the plurality of microballoons 206 impact the sensor 208 at a plurality of locations. The plurality of drop locations align along an east-west direction, thereby determining an orientation of the structure.

As can be seen from table 400 of FIG. 4, there is also a northerly deflection component given by Eq. (3), but its magnitude is generally not comparable to the easterly direction and where positive values of y correspond to north and negative to south.

$$y = \frac{g\cos\theta\sin\theta}{4\Omega^2}\left[1 - \frac{1}{2}(2\Omega t)^2 - \cos(2\Omega t)\right] \text{ (NORTH)} \tag{3}$$

An alternative apparatus for determining a compass direction includes an Atwood machine comprising a first object having a first mass and a second object having a second mass connected by a wire that is draped over a pulley. An acceleration rate of the first object is affected by the presence of the mass of the second object, as shown in Eq. (4), which is analogous to Eq. (2).

$$a = g\frac{(M_1 - M_2)}{(M_1 + M_2)} \tag{4}$$

As long as the mass of the first object is greater than the mass of the second object, the first object will be accelerated downward. However, the mass of the second object can be selected to be close to the mass of the first object in order to achieve a slower downward acceleration rate of the first mass and a longer flight time. The wire attached to the downward going mass will be deflected eastward at a small angle relative to plumb corresponding to the eastward deflection of first object and that angle could also be used to indicate east.

In aspects, a device made according the disclosure herein may be utilized in wireline tools so as to provide a directional survey of a well after it has been drilled and the drill string removed. The underlying physics is that an object dropped from rest at the top of a tower will fall slightly east of where a plumb line would hang. An object at the top of a tower is further from the earth's rotational axis so it is traveling eastward a bit faster than is a point at the base of the tower even though both objects are rotating at the same angular velocity. However, because of conservation of angular momentum, as the object continues to fall, both its eastward speed and its angular velocity keep increasing so that the product of its speed with its distance remains constant. The situation is analogous to a line of ice skaters holding hands at arms' length and rotating about a central pole. If all the ice skaters pull in their arms at the elbows to shorten the line, the line will rotate faster. Similarly, as the object starts to fall, it starts going around the earth faster than does a point at the base of the tower so that, the longer that the object remains in flight, the further east of a stationary plumb line that it will land.

Although the embodiments described herein above relate to falling objects I a controlled environment, the apparatus may be configured to cause the objects to rise or move upward, wherein they will strike or land west of a plumb. An exemplary embodiment may utilize an apparatus wherein the object is immersed in a fluid that has a higher mass density than the object so that the object will, upon release, rise under the influence of gravity and move slightly to the west of plumb. The line from the plumb to the location of its landing defines direction west.

Slowing down the object's fall by using a counterweight (Atwood machine) or by immersing the object in a buoyant fluid (where the downward acceleration equations are analogous to those for an Atwood machine) will increase the eastward deflection and, thereby, make that deflection easier to measure. An exact calculation shows that there is also a slight southern deflection for objects falling in the northern hemisphere and a slight northern deflection for objects falling in the southern hemisphere. However, as shown in FIG. 4, which lists only positive (north) latitude angles, these deflections are usually 10,000 or more times less than the eastern deviation and are ignored herein. The disclosure herein utilizes the rotation of the earth to determine compass direction rather than the earth's magnetic field. Therefore, the east-finding compass made according to this disclosure is a nonmagnetic compass that may be utilized inside cased sections of oil wells wherein the earth's magnetic field is unable to penetrate the ferrous metal casing.

While the foregoing disclosure is directed to the certain exemplary embodiments of the disclosure, various modifications will be apparent to those skilled in the art. It is intended that all variations within the scope and spirit of the appended claims be embraced by the foregoing disclosure.

The invention claimed is:

1. A method of determining a compass direction, comprising:
    allowing at least two objects to move under influence of gravity;
    determining a location of impact of the at least two objects at a device; and
    determining the compass direction from comparing the locations of impact of the at least two objects on the device.

2. The method of claim 1, wherein allowing the at least two objects to move comprises dropping the at least two objects in a fluid having a density less than density of the at least two objects.

3. The method of claim 1 further comprises allowing the at least two objects to move against a selected pressure.

4. The method of claim 1, wherein another location corresponds to one of an plumb line and a location of another object dropped having a flight time that differs from a flight time of the at least two objects.

5. The method of claim 1, wherein the device is configured to provide a signal corresponding to a location where the at least two objects are received on the device relative to a location along a plumb line.

6. The method of claim 5 further comprising determining the compass direction by processing the signal provided by the device at a processor.

7. The method of claim 6 further comprising:
    coating the at least two objects with a selected material that causes the at least two objects to illuminate when exposed to an ultraviolet light; and
    exposing the at least two objects to the ultraviolet light when the at least two objects are moving.

8. The method of claim 5, wherein the device comprises an array of charged coupled devices that provides signals corresponding to locations at which the at least two objects drop on the array.

9. The method of claim 1, wherein the at least two objects include a glass microballoon.

10. A method of performing an operation in a wellbore, comprising:
    conveying a tool into a wellbore; and
    determining a compass direction of the tool in the wellbore by: dropping objects under influence of gravity; determining locations where the objects drop; and determining the compass direction from the locations where the objects drop.

11. The method of claim 10 further comprising performing a selected operation in the wellbore by the tool utilizing the determined compass direction.

12. The method of claim 11, wherein the selected operation is steering the tool in the wellbore.

13. An apparatus for use in a wellbore, comprising:
    a source configured to drop objects under influence of gravity;
    a device configured to receive the dropped objects and provide signals corresponding to locations on the device where the objects drop; and
    a processor configured to determine the direction east from the signals provided by the device.

14. The apparatus of claim 13, wherein the objects are dropped along a plumb line.

15. The apparatus of claim 14 further comprising a mechanism configured to maintain an axis of the device vertical.

16. The apparatus of claim 13, wherein the device includes an array of sensing elements configured to provide the signals corresponding to the sensing elements on which the objects drop.

17. The apparatus of claim 16, wherein the sensing elements are charged-coupled devices, each such device representing a pixel.

18. The apparatus of claim 13, wherein the objects are glass microballoon coated with a fluorescent material.

19. The apparatus of claim 13 further comprising an ultraviolet light configured to illuminate the objects.

20. The apparatus of claim 13 further comprising a pressure generating device configured to reduce speed of the dropping object.

21. The apparatus of claim 13 further comprising a medium surrounding the dropping objects having a density less than the density of the objects.

22. An apparatus for determining a compass direction, comprising:
- a source containing objects configured to drop the objects from a first location toward a second location; and
- a device configured to receive objects dropped from the source at the second location and provide signals corresponding to locations where the objects drop on the device; and
- a processor configured to determine the direction east from the signals provided by the device.

23. A method of determining a compass direction, comprising:
- dropping a first object from a first location toward a second location under influence of gravity with a first flight time;
- dropping a second object from the first location toward the second location under the influence of gravity with a second flight time that differs from the first flight time; and
- determining the compass direction from locations where the first object and the second object drop.

* * * * *